United States Patent [15] 3,645,811
Davies et al. [45] Feb. 29, 1972

[54] METHOD AND APPARATUS FOR CONTROLLING THE SIZE OF PERFORATIONS IN A SHADOW MASK

[72] Inventors: John G. Davies; John C. Thomas, both of St. Paul, Minn.
[73] Assignee: Buckbee-Mears Company, St. Paul, Minn.

[22] Filed: Mar. 2, 1970
[21] Appl. No.: 15,366

[52] U.S. Cl. ....................156/5, 156/11, 156/345
[51] Int. Cl. ....................C23f 1/02, B23p 15/00
[58] Field of Search ....................156/8, 345, 5, 11

[56] References Cited

UNITED STATES PATENTS 1,188,870 6/1916 Williamson ....................156/5
2,822,635 2/1958 Mears ....................156/8

OTHER PUBLICATIONS

Photocell Controlled Etcher-Greene et al., IBM Tech. Discl. Bul, Vol. 10 No. 5, Oct. 1967, pp. 582–4.
The Prior Art described in Fig. 1 by applicants.

*Primary Examiner*—Jacob H. Steinberg
*Attorney*—Stryker and Jacobson

[57] ABSTRACT

Air is blown onto a television shadow mask during the etching of the holes in the mask in order to remove excess etching solution from the holes and permit optical measurement of the size of the holes. Air is also blown onto the optical measurement apparatus for the same purpose.

10 Claims, 4 Drawing Figures

INVENTORS
JOHN G. DAVIES
JOHN C. THOMAS

BY Strybur + Jacobson
ATTORNEYS

METHOD AND APPARATUS FOR CONTROLLING THE SIZE OF PERFORATIONS IN A SHADOW MASK

BACKGROUND OF THE INVENTION

In the prior art manufacture of television shadow masks the small electron-guiding apertures or holes in the masks have been formed by an etching process. Slight variations in the hole pattern require that each mask be used to photographically imprint the phospher dot pattern on the television tube destined to be used with that particular mask. Thus, each mask is first partially etched, used to form the dot pattern, and then etched further to enlarge the holes to the required finished size. This second etching step is referred to in the prior art as an etch-back step and varies in length depending on the particular mask. Variations in the quality of the metal and the characteristics of the ferric chloride etching solution demand that the etch-back process vary from mask to mask. Consequently, in the prior art, before etch-back begins, the hole size is measured to determine how much additional etching is necessary to open the holes to the finished size. Measurement is achieved by directing a light beam through the holes and measuring the amount of light passed as an indication of the hole size. The instrument to accomplish this measurement is generally referred to in the industry as a densitometer.

A problem arises in the prior art at this point due to the fact that the etch-back process requires on the average about four etching stages to open the holes to the correct size. Variations in the quality of the metal and the strength of the etching solution, among other factors, cause wide variations in the final hole size after four etching stages. Attempts to measure the hole size at a later point or inside the etching chambers have proven unsuccessful due to the blockage of the holes with the etching solution which usually comprises a red-colored ferric chloride solution. Our invention permits this later measurement and thus permits a closer control of the etching time and the resultant hole size.

SUMMARY OF THE INVENTION

The present invention contemplates using an airblast from specially designed and positioned tubes to remove excess etching fluid from the shadow mask and the densitometer so as to prevent obstruction of the measuring light beam. The angle of incidence of the stream of air and its intensity are controlled so as to either blow the etching solution out of the holes in the mask or leave a consistent even film of solution in each hole. Thus, it may be seen that it is an object of the present invention to provide an improved etching process for television shadow masks. It is a further object of our invention to provide apparatus to clean a shadow mask so that it may be properly measured with respect to aperture size. Further objects and advantages will become apparent upon consideration of the following description and drawings.

DESCRIPTION OF THE PREFERRED EMBODIMENT

Figure 1:
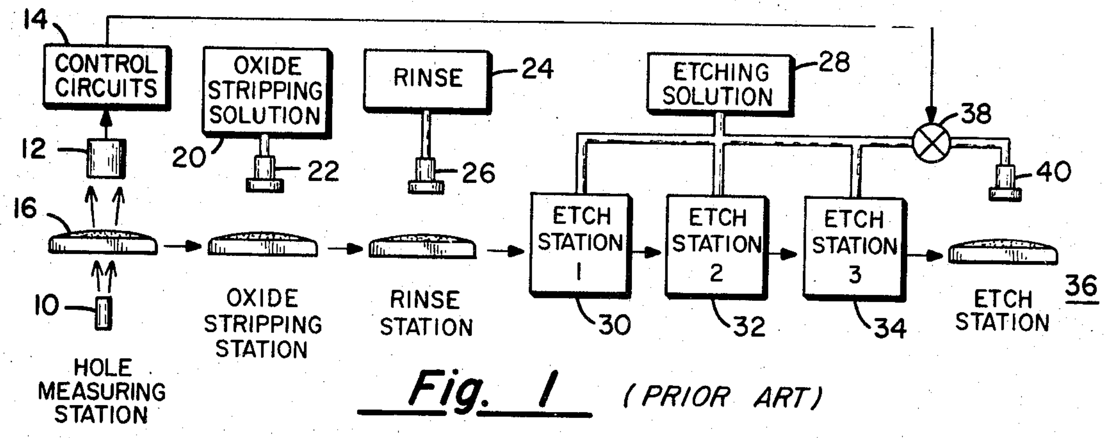
Fig. 1 (PRIOR ART)
FIG. 1 is a diagram of the steps involved in the prior art etch-back process.

In FIG. 1 the steps of the prior art process are schematically shown. A light source 10, light-measuring photocell 12, and appropriate control circuits 14 comprise the densitometer which measures the hole size in a shadow mask 16. Light from source 10 falls on the hundreds of tiny electron-guiding apertures in the shadow mask. The larger the holes the more light passes through to photocell 12 and the larger the signal presented to control circuits 14. Control circuits 14 determine the total amount of etching by controlling the length of the last one or two etching stations. After the hole size is measured, mask 16 is moved by a conveyor belt or other suitable apparatus to an oxide-stripping station where the mask is sprayed with a deoxidizing solution from a reservoir 20 by a nozzle 22. The mask is then moved to a rinse station where a water reservoir 24 supplies water to a nozzle 26. The mask is then subjected to an etching spray to enlarge the holes. FIG. 1 shows the usual prior art arrangement where four separate etching stations are used to help speed up the assembly line. Etching solution reservoir 28 supplies the four stations, 30, 32, 34 and 36. A valve 38 controls the flow of etching solution to nozzle 40 in station four and is, in turn, controlled by control circuits 14. As mentioned earlier the prior art etch-back process of FIG. 1 often results in a high percentage of unacceptable masks due to improper final hole size which results from the unavoidable variations in the metal, etching solution and other factors.

The present invention permits the hole measurement to be made just before the final etching spray thus, yielding a much more exact control and a much higher yield of acceptable masks. Since most of the etching has been completed at this point the variations in metal and etching solution have had most of their effect and the final short spray may be varied from zero to a maximum amount of time to obtain the exact hole size.

Figure 2:
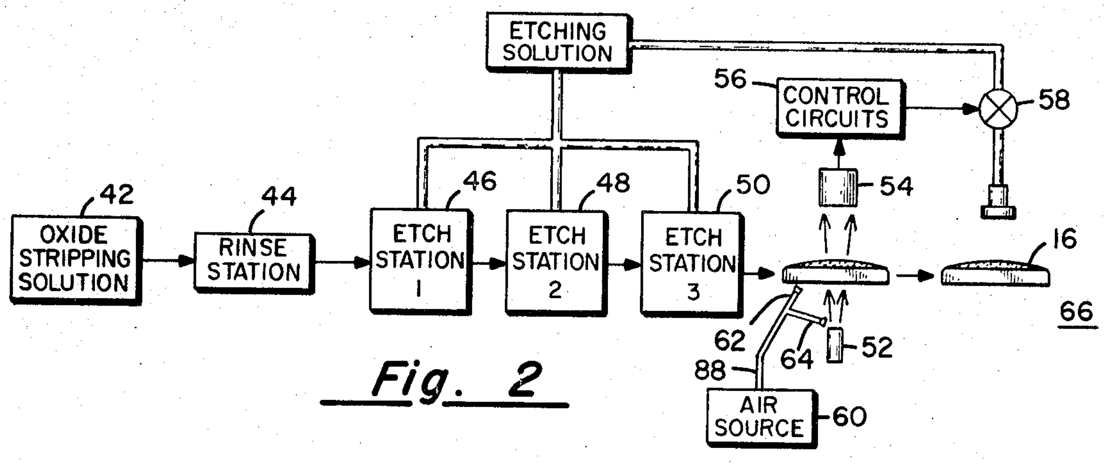
FIG. 2 is a diagram of the steps used with the present invention in the etch-back process.

The present invention permits the process shown in FIG. 2. The mask starts at an oxide-stripping station 42 and goes to a rinse station 44 and the first three etching stations 46, 48 and 50. Etching stations 46, 48 and 50 operate to enlarge the hole size close to but not exceeding the final desired value. In the present invention the densitometer is utilized at this point and comprises a light source 52 and a photocell 54 connected to control circuits 56 and valve 58. As mentioned earlier this measurement would normally be impossible due to the apertures being clogged with the red-colored ferric chloride etching solution from the previous etching stations. To avoid this problem a pressurized air source 60 is connected to suitable nozzles 62 and 64 which direct a stream of air onto the shadow mask and onto the light source 52 so as to blow away the light obstructing etching solution. Following this air-cleaning process it is possible to make an accurate measurement of the hole size and control the length of the spray of etching solution in the final etching station 66 so as to achieve the exact predetermined final hole sizes in the shadow mask 16. Sometimes the three initial etching stations will enlarge the holes beyond acceptable limits. In this case another airstream-cleaning station and measuring densitometer may be placed just before the third etching station to insure total control of all the masks. FIG. 2 shows the airblast-cleaning equipment only schematically. A better understanding of this apparatus may be had by reference to FIG. 3.

Figure 3:
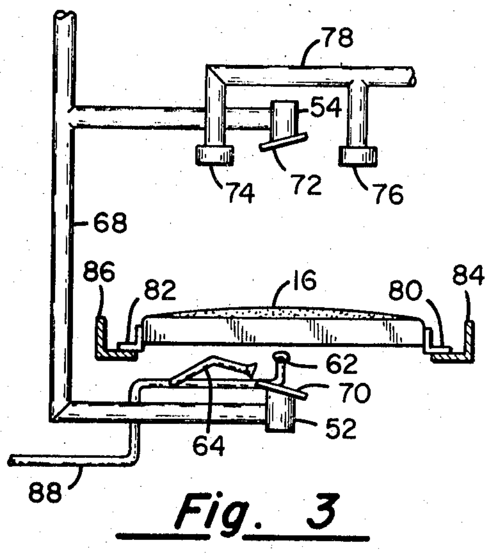
FIG. 3 is a schematic view of the major components in the present invention which comprise the mask-cleaning apparatus.

In FIG. 3 a portion of the assembly line apparatus is shown as it would be viewed from the right-hand end of the assembly line of FIG. 2. Light source 52 and light detector 54 are mounted in suitable extensions of a titanium housing 68 which serves to protect the various electrical and mechanical parts from the corrosive etching solution. A pair of windows 70 and 72 are provided on the source and the detector to encourage the etching solution to run off the light source and detector under the action of gravity. Two etching solution nozzles 74 and 76 are shown, only by way of example, mounted in a suitable housing 78. The shadow mask 16 is provided with mounting clips 80 and 82 at its edges which clips slide along a pair of guideways or tracks 84 and 86. In the preferred embodiment each mask is attached to the one ahead of it so that the masks are pulled successively through the etching stations in a train-like fashion. However, many variations may be used to position the masks for measurement and the particular approach chosen does not constitute a part of the present invention.

Figure 4:
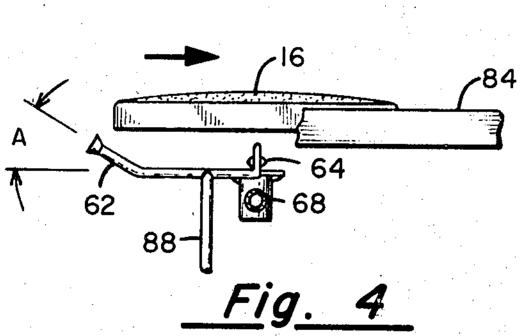
FIG. 4 is another schematic view of the apparatus of FIG. 3.

The pressurized air is brought in by means of a titanium tube 88 which is divided into nozzles 62 and 64. Nozzle 62 is inclined upwards to direct air onto the underside of the shadow mask in the area where the optical measurement is to be made. The tips of tubes 62 and 64 are suitably flared in order to spread the airstream over sufficient area. Although nearly any size tubing may be used we have found ⅛-inch inside diameter tubing to work particularly well. Two approaches to cleaning the mask have been found suitable. Simultaneous reference should be had to FIG. 4 which shows the apparatus of FIG. 3 as viewed from the left in FIG. 3. Nozzle 62 may be inclined rather steeply toward mask 16 so as to blow all of the etching solution out of the holes to insure an accurate optical measurement. However, this approach requires comparatively high pressures in order to insure that every hole is cleaned completely of etching solution. High pressures may distort the rater fragile shadow mask and therefore are undesirable. It has been found equally acceptable in the preferred embodiment to incline tube 62 in such a manner as to shear all of the excess ferric chloride etching solution from the mask leaving only a thin film in each hole. Since the film in each hole is uniform in optical transmissivity and since the ferric chloride is, although colored, partly transparent, an even consistent measurement can be made with the solution still in the holes. The ferric chloride etching solution is relatively viscous and tends to cling to the bottom of the mask in small droplets of uneven thickness. It has been found that these small droplets can be blown away leaving only a thin film in each hole and an optical measurement can then be accurately made. To accomplish this cleaning or shearing action tube 62 may be made adjustable so that it can be positioned at the optimum angle with respect to shadow mask 16. The natural flexibility of the tube itself will usually serve to provide sufficient adjustment to achieve just the correct angle. In the preferred embodiment a wide range of angles from 0° to 90° have been used successfully but the best operation has been found to result with angles ranging between 30° and 45° as indicated in FIG. 4 by the angle A. In this range of angles a pressure of approximately 10 pounds per square inch has been found adequate. This pressure is not too strong for the fragile shadow mask. However, it is important to notice that tube 62 has been placed beneath shadow mask directing air onto the concave side as opposed to above the shadow mask where it has been found that substantial deformations of the shadow mask result from the airstream.

As mentioned earlier the windows on the light source 52 and the light detector 54 are inclined in order to cause the etching solution to roll off under the action of gravity. However, this has been found inadequate in view of the fact that the etching solution is extremely viscous and tends to cling to the surfaces. To insure that the optical-measuring apparatus remains clean, tube 64 is angled and flared to blow air directly across the surface of window 70 on light source 52 thereby cleaning off any remaining etching solution and maintaining window 70 clear and transparent. It should be understood that a third tube could be used to direct air onto window 72 but in the preferred embodiment this has been found unnecessary since window 72 is positioned above nozzles 74 and 76. Air source 60 (shown in FIG. 2) may be a standard electric air compressor or on the other hand may be pressurized bottles of gas such as nitrogen. The particular gas used is discretionary and the particular source of pressurization is not a necessary element of the present invention. In the apparatus shown the air is blowing all the time although this is not a necessary limitation to the invention. Since there are a number of variations in the position of the tubing, mask, and densitometer components not all embodiments can be shown or described in the drawings and, thus, I do not intend to be bound to the particular embodiments which have been chosen except as defined by the appended claims which define the invention in the proper scope and breadth.

We claim:

1. In the method for enlarging electron-guiding apertures in a shadow mask to predetermined sizes which involves the steps of spraying the mask with an etching solution for a predetermined interval of time sufficient to enlarge the apertures to a size close to but less than the predetermined sizes, measuring the aperture size by passing a beam of energy through the apertures to intensity measuring apparatus, and spraying the mask with additional etching solution for a controlled interval of time in accordance with the measured aperture size so as to further enlarge the apertures to the predetermined sizes, the improvement comprising the step of directing a fluid medium onto the mask so as to render the apertures substantially and evenly optically transmissive.

2. The method of claim 1 including the step of directing the fluid medium into portions of the path of the

3. In apparatus for producing a shadow mask for color television picture tubes by etching, the improvement comprising, in combination: means for applying etching solution to a metal sheet to produce openings through said sheet; means for directing a fluid onto the etched metal sheet for removing at least some of the etchant from the etched openings; and means for measuring the etched openings by passing radiation therethrough after said fluid-directing means has removed at least some of the etchant.

4. The apparatus of claim 3 in which said means for directing a fluid onto the etched metal sheet comprises a pressurized source of gas and at least one nozzle connected to the source.

5. The apparatus of claim 4 wherein said measuring means comprises optical aperture measuring apparatus and further including a nozzle connected to said source positioned to direct a stream of gas onto said aperture measuring apparatus for preventing said fluid from interfering with the optical measuring.

6. Apparatus for enlarging the electron guiding apertures in a color television shadow mask to predetermined sizes, comprising: first spray means for spraying etching solution onto the apertures for a predetermined interval of time so as to etch out the apertures nearly to the predetermined sizes; means for directing a fluid stream onto said partially etched mask so as to remove excess etching solution therefrom; means for projecting a beam of energy through the apertures in the mask; measuring means for measuring the amount of energy passing through said apertures as an indication of the size of the apertures; second spray means for spraying additional etching solution onto said mask for further etching out the apertures; and control means connected to said second spray means and said measuring means for controlling the operation of said second spray means to enlarge the apertures to the predetermined sizes.

7. The apparatus of claim 6 in which said fluid-directing means also directs a fluid stream toward said projecting means so as to prevent the etching solution from obstructing said beam of energy.

8. The apparatus of claim 7 in which said fluid-directing means comprises, a pressurized source of gas and nozzles connected to said source positioned to direct streams of pressurized gas at the apertures of the shadow mask and at the projecting means.

9. The apparatus of claim 8 in which the nozzles which direct gas to the apertures is positioned at an angle of approximately 30° to 45° with respect to the plane of the apertured surface of the mask.

10. The apparatus of claim 9 in which the nozzles are positioned to direct gas at the concave side of the apertured shadow mask so as to prevent deformation of the mask by the gas stream.

* * * * *

UNITED STATES PATENT OFFICE
CERTIFICATE OF CORRECTION

Patent No. 3,645,811 Dated February 29, 1972

Inventor(s) John G. Davies and John C. Thomas

It is certified that error appears in the above-identified patent and that said Letters Patent are hereby corrected as shown below:

Column 4, line 17, after "the" (second occurrence) insert -- beam so as to prevent any obstruction of said beam. --

Signed and sealed this 29th day of August 1972.

(SEAL)
Attest:

EDWARD M.FLETCHER,JR.
Attesting Officer

ROBERT GOTTSCHALK
Commissioner of Patents